United States Patent [19]

Lieberman et al.

[11] Patent Number: 4,461,876

[45] Date of Patent: Jul. 24, 1984

[54] POLYMERIC REAGENTS FOR THE ISOLATION AND PROTECTION OF CARBONYL COMPOUNDS

[75] Inventors: Seymour Lieberman, Flushing; Veeramac V. K. Prasad; Patricia A. Warne, both of New York, all of N.Y.

[73] Assignee: Columbia University, New York, N.Y.

[21] Appl. No.: 416,103

[22] Filed: Sep. 9, 1982

[51] Int. Cl.$^3$ .......................... C08F 8/32; C08F 8/18
[52] U.S. Cl. ..................... 525/374; 525/377; 525/420; 525/403; 525/437; 525/453; 525/462; 525/474; 525/538; 525/326.1; 525/326.4; 525/333.3; 525/333.7; 525/509; 521/56
[58] Field of Search ............... 525/377, 420, 403, 437, 525/453, 462, 474, 538, 374, 326.1, 326.4, 333.3, 333.7, 509

[56] References Cited

U.S. PATENT DOCUMENTS

| | | | |
|---|---|---|---|
| 4,094,756 | 6/1978 | Taylor | 525/374 |
| 4,316,972 | 2/1982 | Petrak | 525/374 |

Primary Examiner—John Kight, III
Assistant Examiner—M. L. Moore
Attorney, Agent, or Firm—Oblon, Fisher, Spivak, McClelland & Maier

[57] ABSTRACT

A polymeric reagent for the isolation and protection of carbonyl compounds comprising a polymer having a functional group of the formula —ONH$_2$ covalently attached to the polymer where the functional group is capable of reacting with a carbonyl group of a carbonyl compound when a solution containing the carbonyl compound contacts the polymeric reagent is disclosed along with methods of using this reagent.

13 Claims, No Drawings

POLYMERIC REAGENTS FOR THE ISOLATION AND PROTECTION OF CARBONYL COMPOUNDS

This invention was made during the course of work under a grant from the National Institutes of Health.

BACKGROUND OF THE INVENTION

1. Field of the Invention

The present invention relates to a polymeric reagents capable of reacting with the carbonyl functional group of a carbonyl compound, thereby enabling the isolation of the carbonyl compound or the protection of the carbonyl functional group from later reactions. More particularly, the invention relates to a polymeric material having functional groups of the formula $-ONH_2$ capable of such reaction.

2. Description of the Prior Art

Various reagents are available for the isolation of trace amounts of carbonyl compounds from complex mixtures containing many different impurities. The separation is generally accomplished by separating components into various phases. Since high molecular weight carbonyl compounds and most other organic compounds with which they are normally contaminated are normally soluble in organic solvents and insoluble in water, the most common separation techniques now used involve the conversion of the carbonyl compound into a water soluble form, separation of the aqueous from the non-aqueous phase, and reconversion of the carbonyl compound into its original form. The most commonly used reagents for accomplishing this are Girard reagents such as Girard reagent T (trimethylaminoacetohydrazide chloride).

However, these reagents are not suitable for all carbonyl compounds. For example, difficulty has occurred in attempting to isolate steroid hydroxy ketones esterified with various long chain fatty acids. Such compounds are known as lipoidal derivatives of steroids. The isolation of such molecules presents a special problem in that they are highly liphophilic, and tissue extracts containing these compounds are always contaminated with large amounts of triglycerides and other non-polar compounds. These lipoidal derivatives of steroids are so liphophilic that the partitioning of their Girard hydrazones between an aqueous and an organic phase is uncertain. In addition, the solublizing effect of the contaminating lipids helps reduce the water solubility of the hydrazones upon which this isolation technique depends. Furthermore, such liquid-phase separation techniques require manipulating large volumes of solvent when only trace amounts of a ketone is present in an extract containing very much larger quantities of non-ketonic lipids.

Accordingly, various prior art references have suggested the use of polymer-bound reagents in order to effect a solid-liquid phase separation. Polymer-bound 1,2-diols and 1,3-diols have been synthesized for the separation and protection of carbonyl functional groups. While these reagents have been found to form acetals with aldehydes in good to excellent yields, they have been less successful in their reactions with ketones.

Several reagents have been proposed which resemble a Girard reagent attached to a solid phase. For example, the preparation of a polymeric acrylate hydrazide and its use as an absorbant for carbonyl compounds was described in Namiki et al., Nappon Nogei Kagaku Kaishi, 35, 570 (1961). This reagent was prepared by forming a polymer from methyl acrylate crosslinked with divinylbenzene. Some of the pendant carboxylic acid ester groups were converted into hydrazide functional groups as shown in the following reactions scheme:

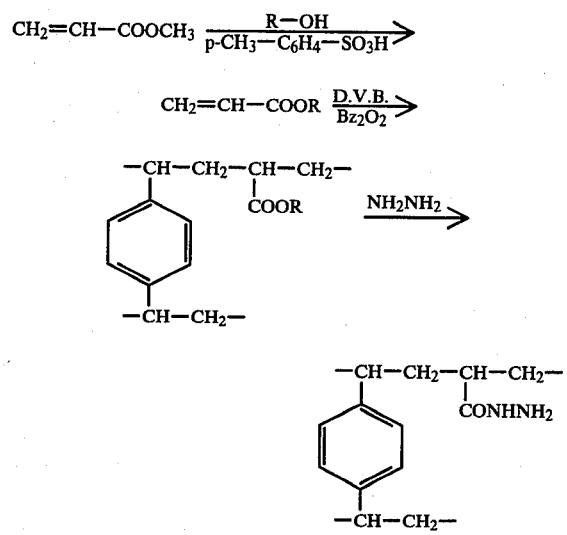

This reagent was shown to be able to remove carbonyl compounds from solution, but the recovery of the bound compounds from the resin was not reported. Recent work by the present inventors has indicated, however, that recovery of bound compounds from hydrazide-containing, solid-phase reagents is incomplete and that the Namiki resin does not bind steroidal ketones. Accordingly, a new polymeric reagent is needed which will react efficiently with liphophilic and other ketones and which will release bound ketones and aldehydes from the polymeric carrier under mild conditions.

SUMMARY OF THE INVENTION

Accordingly, it is an object of this invention to provide a polymeric reagent for the isolation and protection of carbonyl compounds which will react efficiently with a carbonyl compound in unpurified form and later release the bound compound under mild conditions of hydrolysis.

It is a further object of this invention to provide a polymeric reagent which can be used to protect ketones and aldehydes during reactions occurring at other positions of the molecule.

These and other objects of the invention, as will hereinafter become more readily apparent, have been accomplished by providing a polymeric reagent for the isolation and protection of carbonyl compounds, comprising a polymer having a functional group of the formula $-ONH_2$ convalently attached to the polymer wherein the functional group is capable of reacting with a carbonyl group of the carbonyl compound when a solution containing the carbonyl compound contacts the polymer.

DESCRIPTION OF THE PREFERRED EMBODIMENTS

The present invention arose out of studies directed to the isolation of lipoidal derivatives of steroids from tissue extracts containing these compounds. Since only trace amounts of these carbonyl compounds are present in the biological extract from which they are obtained, a highly efficient means of extracting them is needed. The present inventors investigated the use of polymeric reagents containing hydrazide functional groups but discovered that these reagents were inefficient. By synthesizing a polymeric reagent comprising an a polymer having aminooxy functional groups of the formula —$ONH_2$ covalently attached to the polymer, the inventors were able to achieve the desired separation.

An examination of the functionality of the hydrazide-containing an aminooxy-containing polymeric reagents does not account for the greater binding efficiencies and greater ease of hydrolysis of the resulting polymeric O-substituted oximes. Girard reagents contain the hydrazide functionality, and therefore the hydrazide functionality would appear to be the functionality of choice for reagents of this type. Furthermore, it is surprising that the aminooxy compound is at the same time both more reactive in the formation of an oxime with carbonyl compounds and more subject to hydrolysis of the oxime to reform the starting carbonyl compound. Greater reactivity would normally be expected to result in more stability of the resulting product and slower or less complete release of the starting carbonyl compound. However, formation of the solid phase oximes of the present invention proceeds to a degree approaching 100% during the same time in which a comparable hydrazide reacts to a degree of 50%. Quantitative regeneration of the ketone or aldehyde from the oxime also generally occurs.

The reagents of the invention consist of two essential parts: a polymeric backbone and an aminooxy functional group attached to the backbone. The type of polymer used is not critical as it merely provides a carrier to which the reactive functional group is attached. Any polymeric material either soluble or insoluble in water or organic solvents is suitable. Examples of suitable types of polymers, not intended to be limiting, include polyamides, polyesters, polyolefins, polyvinyls, polyurethanes, polyethers, and polyimides. In addition to these organic polymers, organic/inorganic polymers such as polyorganophosphazenes and polysilicones may be used as well as completely inorganic polymers such as silica gel and glass.

Suitable polyamides include polyamino acids, such as polymers of p-aminobenzoic acid, and condensation products of diamines with dicarboxylic acids, such as hexamethylenediamine and terephthalic acid. Polyesters suitable for use with the invention include polymers of hydroxy acids, such as lactic acid, and condensation products of diols or polyols with dicarboxylic acids, such as ethylene glycol and an aromatic dicarboxylic acid. Examples of polyvinyls include poly(methyl methacrylate) and other esters of acrylic and methacrylic acid, polyvinyl alcohol, polyvinylpyrrolidone, and esters of polyvinyl alcohol. Polyolefins include polyethylenes such as polyethylene itself and halogenated derivatives of polyethylene, such as polyvinyl chloride, as well as perhalogenated polyethylene, such as polytetrafluoroethylene. Other polyolefins such as polypropylene and its derivatives are also contemplated. Polyurethanes include addition products of aromatic, aliphatic, or araliphatic diisocyanates with either diamines or diols. Polyethers include epoxy resins such as poly(propylene oxide) and poly(ethylene oxide). Polyimides include polymers derived from pyromellitic dianhydride and aromatic or aliphatic diamines. Inorganic polymers include alkoxy and aryloxy polyphosphazenes such as poly(diphenoxyphosphazene), siloxanes such as polydimethylsiloxane, and completely inorganic silicon-based polymers such as silica gel and glass. Methods of attaching the required aminooxy functionality to each of these types of compounds will be discussed later.

Since the polymer merely acts as a function group carrier, any other functional group that does not interfer with reaction of the oxyamine group with the carbonyl compound or with the later release of the reagent-bound product can be present in the polymeric reagents of this invention. A simple test for suitability of polymers can easily be carried out by routine experimentation. A polymer having an oxyamine functional group is prepared (infra) and the presence of the oxyamine groups is verified by any suitable technique such as infrared spectroscopy. A simple carbonyl compound, e.g., acetone or cyclohexanone, is reacted with the polymer and formation of an oxime is determined, also by infrared spectroscopy. Disappearance of the oxime group and reappearance of the carbonyl group can likewise be verified by infrared spectroscopy. If oxime formation occurs to any significant extent and at least 80% of the carbonyl groups are then regenerated by hydrolysis, the polymer is suitable for the purposes of the invention.

The physical form in which the polymer is produced is not critical. Solid phase reagents are convenient because of the ease with which they can be separated from the fluid medium in which the reaction is carried out. It is preferred that a large surface area per unit weight of polymer be obtained for solid-phase polymers in order that a high capacity reagent may be obtained. Surface areas of from 0.1 to 10 $m^2$ per gram of polymer are preferred with about 0.8–1.3 $m^2/g$ being more preferred. Typical reactions will occur on both inner or outer surfaces of the solid. Accordingly, a porous polymer is preferred over a solid polymer body. Pores should be of sufficient size to allow the carbonyl compound being reacted with the solid-phase reagent to enter into the pores and react with the oxyamine functional groups. Pores having a diameter in the range of 80 to 200 nm are preferred although pore size is actually limited only by the size of the carbonyl compound (lower limit) and the stability of the porous polymer (upper limit). Most preferred is a bead-like porous material having reactive functional groups in the pores and on the surface of the polymer.

Steric hindrance can be avoided by adding the aminooxy functional group after the polymer is formed. A polymeric reagent formed by copolymerization of a monomer having the aminooxy group and a second monomer will also produce a workable reagent since reactive functional groups will be present on the surface of the polymer and reactive groups that are not accessible will not interfere with the usefulness of the reagent. For example, a suitable reagent according to a preferred embodiment can be prepared from commercially available chloromethylated polystyrene.

In addition to reagents based on insoluble polymers as previously discussed, it is also possible to carry out this invention using polymers in which the —$ONH_2$ reactive functionality is attached to a soluble polymer. The reagent may be soluble in water or in an organic solvent such as an ether (e.g., diethyl ether or tetrahydrofuran), alcohol (e.g., ethanol or methanol), aromatic hydrocarbon (e.g., toluene or xylene), or chlorinated hydrocarbon (e.g., methylene chloride or chloroform). As previously discussed, the polymeric nature of the reagent facilitates separation based on the physical properties of polymers but does not affect the reactive functional group except for possible steric hinderance which can be avoided by adding the functional group after the polymer is formed. Accordingly, a soluble polymer may be used to react with the carbonyl compounds followed by separation or the reagent-bound product from the remainder of the solution by precipitation of the polymer, dialysis, ultrafiltration, gel chromatography, or other techniques which can separate a soluble polymer from the medium in which it is dissolved. Particularly suitable is addition of a second solvent miscible with the first solvent but in which the polymer is less soluble so that precipitation of the reagent occurs. After precipitation, the "soluble polymer" has become an "insoluble polymer".

Soluble polymers having reactive functional groups of other types have previously been used for various purposes in organic synthesis. For example, polystyrene-based carriers soluble in organic solvents have been used in the synthesis of oligonucleotides. Other workers have used polyvinylpyrrolidone to form water soluble carrier systems for oligonucleotide synthesis as well as copolymers of N-vinylpyrrolidone and vinylacetate which are soluble in both water and pyridine. Substitution of the present reactive functional group for those present in these polymers produces reagents of this invention. Publications disclosing such polymers include Hazalsa et al., J. Amer. Chem. Soc. 88, 3182 (1966); Seita et al., Makromol. Chem. 164, 15 (1973); and Seliger et al., Tet. Lett. 1973, 2911, all of which are herein incorporated by reference.

The method of attaching the reactive functional group to the polymer is not critical. The oxyamine functional group may be attached directly to the main chain of the polymer or to a side chain or may be attached to either of these by means of a linking group. By "main chain of the polymer" is meant those atoms directly involved in forming the continuous chain of atoms that hold the polymer together. Those carbon atoms and other parts of the molecule not forming the chain but which were part of the monomer from which the polymer was produced are said to be "side chains". For example, the phenyl group of polystyrene is considered to be a side chain for the purposes of this invention. A "linking group" is a divalent organic radical which is covalently attached at one end to the oxygen of the aminooxy group and at the other end to an atom of a main or side chain. An organic linking group in which the oxygen of the aminooxy group is attached by a covalent bond to an aliphatic carbon atom of the linking group is preferred. The length of the linking group is also not critical as the linking group merely serves to separate the reactive functional group from which the main chain of the polymer so that steric interactions do not interfere with reaction of the ketone with the functional group. For example, the linking group may comprise a linear chain of up to 12 atoms, for example, chains in which carbon atoms are either attached directly to each other or interspersed with 1 to 4 oxygen atoms to form ether linkages. Most preferred is direct attachment of the oxyamine oxygen to a methylene carbon of the linking group for the greatest steric freedom. Linear chains of up to 6 methylene carbons are preferred as the linking group. However, other organic functional groups capable of extending into space from the main chain of the polymer may be used with equal success. A paraphenylene, acyl, or silyl group, for example, is also suitable. No restrictions are placed on the polymer or linking group structure other than those mentioned herein.

Surprisingly, it has been discovered by the inventors that a long linking group separating the reactive function from the main chain of the polymer is not necessary. In a preferred embodiment of the invention, the polymer is prepared from insoluble chloromethylated polystyrene. This material, which is commercially available from many sources, comprises polystyrene crosslinked with a small amount of divinylbenzene and contains chloromethyl groups attached to some styrene phenyl groups. As will be shown when the reactions for attaching the functional group to the main chain of the polymer are shown, the chlorine can easily be replaced by the aminooxy group so that a single methylene group links the reactive functionality with a side-chain phenyl group of the polymer. Direct attachment of the aminooxy group to the polymer chain or a polymer side group are likewise possible.

The aminooxy functional group may be attached to the polymer backbone by any reaction which results in a covalent link between the oxygen atom of the functional group and an atom in a main or side chain of the polymer or the linking group. It is clearly impossible to list all possible reactions capable of producing suitable reagents. Accordingly, a general method for attaching an aminooxy group to polymers example will be given in which a halogen atom attached to a linking group which is itself attached to a side chain or the main chain of the polymer is eventually replaced with an aminooxy functional group. Examples will then be given from each of the classes of polymers previously listed followed by a brief discussion of other means of attaching the functional group. This discussion is not limiting of the methods by which the reactive functional group may be attached to the main chain of the polymer.

The general method will be illustrated by an example. Chloromethylated polystyrene is a preferred intermediate polymer and is commercially available. This material is formed by chloromethylation of styrene with hydrochloric acid and formaldehyde (or with chloromethyl methyl ether), usually in the presence of a catalyst. Conversion of the chlorine atom of the chloromethylated polystyrene to an aminooxy group is shown in the following reaction scheme:

SCHEME I

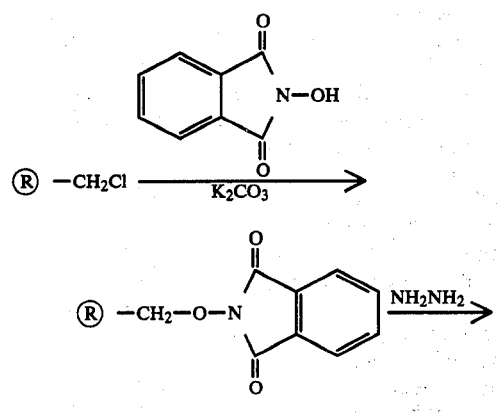

-continued
SCHEME I

Reaction of N-hydroxyphthalimide (or N-hydroxysuccinimide) in the presence of potassium carbonate produces a hydroxyphthalimide (or hydroxysuccinimide) derivative which can be cleaved with hydrazine to produce the desired functional group.

The halogen atom of other aliphatic halo compounds can be replaced in a similar manner. Accordingly, many polymers suitable for use in the present invention can be prepared by free radical halogenation, preferably chlorination, of the surfaces of a preformed polymer to give a polymer having halogen atoms attached to aliphatic carbon atoms followed by the above-discussed conversion of the halogen into an aminooxy functional group. Examples of polymers containing aliphatic carbons are polyolefins; polyamides and polyesters having aliphatic acid, amino, or hydroxy monomers; polyphosphazenes and polysiloxanes having aliphatic organic side groups; and so forth.

Particularly preferred are polymers synthesized from monomers having an aromatic ring, particularly a phenyl ring, whether in the main chain or a side chain of the polymer, although side chain aromatic rings are preferred. These polymers may be halomethylated by standard, well-known techniques, for example as disclosed in *Preparative Organic Chemistry*, Hilgetag and Martini, eds., John Wiley & Sons, N.Y., 1972, pp. 158, 952-954. Other articles which review halomethylation include Adams, *Org. Reactions*, 1, 63 (1947); Houbel-Weyl, *Methoden der organischen Chemie*, Georg Thieme Verlag, Stuttgart, 4th ed., 1962, Volume 5, Part 4, p. 484; and Merrifield, *J. Amer. Chem. Soc.*, 85, 2149 (1963). Sections of all four of these articles relating to halomethylation are herein incorporated by reference.

In general, chloromethylation is preferred and is accomplished by reacting the aromatic polymer with hydrochloric acid and formaldehyde (or with chloromethyl methyl ether), usually in the presence of a catalyst, such as zinc chloride. Phosphoric acid may be added to improve the yield. The reaction may be carried out without a solvent or in a solution of, for example, chloroform, carbon tetrachloride, light petroleum, or acetic acid. The chlorine of the resulting chloromethylated compound can be converted to an aminooxy functional group according to the method previously described.

It is not necessary for each repeating unit in the polymer to contain the aminooxy functional group. Preferred are polymers in which there are from 1 to 75 aminooxy groups per 100 repeating units. Most preferred are from 15 to 50 per 100 repeating units.

Such compound will be copolymers, although the original polymer may have been formed from only one type of monomer. Other copolymers may also be used as the polymer of the invention, for example, polyamides formed from a mixture of diamines or diacids where only one of the diacids (for example) has an aromatic ring. Polyolefins made from ethylene or propylene monomers but containing a few percent of, for example, styrene monomers are also suitable. Other copolymers of this type are easily prepared by adding a small portion of a monomer having an aromatic (especially phenyl) side group to any monomer or mixture of monomers that is being used to prepare a polymer. The polymer is converted into a polymeric reagent of the invention after chloromethylation of the aromatic ring and conversion of the chlorine to aminooxy derivatives. Crosslinking monomers, such as tricarboxylic acids for polyamides or polyesters and divinyl compounds for polyolefins, are also suitable for use in preparing reagents of the invention. Polymers are prepared from monomers according to the well established procedures for the polymer type being synthesized.

Examples of repeating units having the required functionality which can be prepared by the previously discussed methods are given for the various classes of polymers listed below:

Polyamides

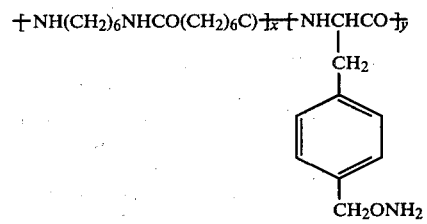

Polyesters

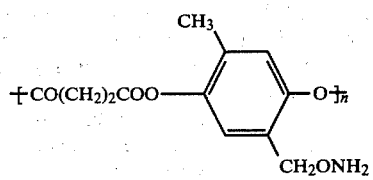

Polyvinyls

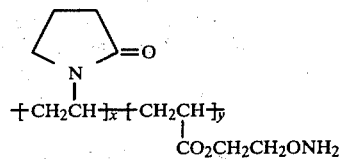

Polyolefins

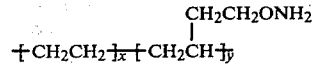

Polyurethanes

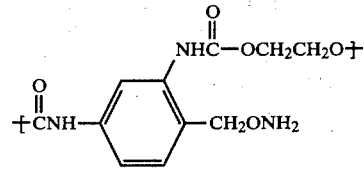

Polyethers

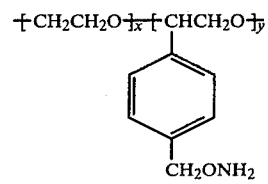

Polyimides

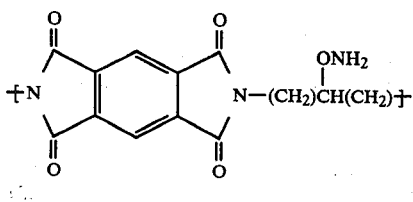

Polyphosphazenes

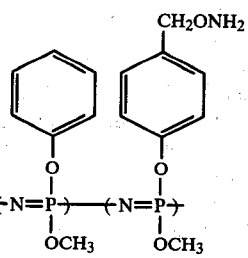

Siloxanes

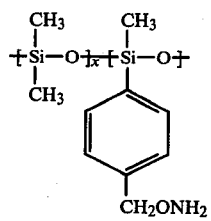

Silica gel or glass

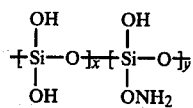

In the above examples of polymer structures, n and (x+y) are greater than 20 and preferably greater than 100, x is greater than or equal to y, and (m+p) is about 5. All of the polymers shown can be synthesized from commercially available or easily synthesized monomers. The aminooxy functional group can be introduced by replacement of a halogen atom that was introduced by free radical chlorination of an existing alkyl group (the polyimide, polyester, and polyurethane); present as part of a monomer (4-bromo-1-butene for the polyolefin, β-chloroethyl acrylate for the polyvinyl); or introduced by chloromethylation of a polymer in which some of the monomers contained phenyl side-groups (the polyamide, polyether, polyphosphazene, and siloxane). The silica gel/glass reagent can be prepared by an additional method that is particularly suitable for polymers having free hydroxyl groups in which chloroamine reacts with free hydroxyl groups to produce an aminooxy derivative (and HCl).

The polymeric reagents of the invention are utilized by contacting the polymeric reagent with a fluid medium containing a free carbonyl compound in solution. The medium may be either aqueous or an organic solvent. The type of contacting naturally depends on whether a solid-phase reagent or a soluble reagent is used. Contacting of solid-phase reagents may be carried out by passing a solution containing the carbonyl compound through a column containing the reagent or by suspending the solid-phase reagent in a solution containing the carbonyl compound. Soluble reagents may be dissolved in a solvent which is also capable of dissolving the carbonyl compound with which reaction is desired. The contact time required for sufficient reaction will vary depending on the carbonyl compound used. Contact times of 1 to 3 hours are typical although shorter or longer contact times may be used if especially slow or rapid reaction occurs. With sterically hindered carbonyl compounds, particularly ketones, longer reaction times (contact times) will normally be required, for example, contact times of 24 hours or more.

It is generally desirable to include an acid in the medium in which reaction is taking place in order to enhance the rate of reaction. Proton donating acids, such as HCl or acetic acid, can be used as well as Lewis acids. Protic acids are preferred, particularly for use in water and other solvents capable of forming hydrogen bonds.

Contacting the polymeric reagent with a free carbonyl compound in the presence of an acid produces a reagent-bound compound in which the carbonyl group has reacted with the oxyamine functional group of the reagent. This reagent-bound compound may be then treated in various ways depending on the next desired step. If a separation is being carried out, the next step will typically be separation of the reagent-bound compound from other materials present in the reaction medium. Filtration or even decanting is suitable when a solid-phase reagent is used. However, if a soluble reagent is being used, other separation techniques will have to be used. Methods which separate soluble polymeric materials from smaller molecules are suitable for soluble polymeric reagents of this invention. Such methods include gel chromatography (Sephadex gel filtration), dialysis, and precipitation of the soluble polymer by addition of a miscible second solvent in which the polymeric reagent is less soluble. If a precipitation step is used, the precipitated polymeric reagent having the carbonyl compound bound thereto can then be separated by the usual filtration techniques.

If the reagent of the invention is being used as a protective group, a second step generally involves reacting the reagent-bound compound with a reagent capable of reacting with the carbonyl group when the carbonyl compound is unbound but not with the oxime that has been found in the reagent-bound compound. Typically the reaction occurs with a second functional group present in the reagent-bound compound to give a reagent-bound product. For example, a hydroxyl group may be oxidized or a second carbonyl group may be reduced. After this reaction is completed, a free product containing the original carbonyl group is released from the reagent, for example by hydrolyzing the reagent-bound product.

In general, the reagent of this invention may be used in any manner for which other carbonyl protecting groups have previously been used.

Having now generally described this invention, the same will be better understood by reference to certain specific examples, which are included herein for purposes of illustration only and are not intended to be limiting of the invention or any embodiment thereof, unless specified.

EXAMPLE 1

Preparation of a Polymeric —ONH$_2$ Reagent (Resin 1)

To a solution of the potassium salt of N-hydroxyphthalimide, prepared by adding 13 g of K$_2$CO$_3$ (98 mmol)

to a solution of N-hydroxyphthalimide (15.5 g, 98 mmol) in 300 ml of dimethyl sulfoxide (DMSO), was added 20 g of chloromethylated polystyrene (80 mmol). The mixture was stirred at 80° C. for 24 hr. The reaction mixture was then poured into 1 liter of ice water and filtered. The activated resin was washed successively with ethanol (EtOH), benzene and ethyl acetate (EtOAc) and then oven dried. Volhard titration for residual chloride was negative; i.r. 1775 (m), 1735 (s) cm$^{-1}$ (imide carbonyl).

Five g of activated resin was suspended in 200 ml of absolute ethanol and 5 ml of hydrazine (99%) and the mixture refluxed for 4 hr. The resin was then filtered, washed and oven dried; i.r. 3600–3100 (broad) (—ONH$_2$). The resin contained 1.5 mmoles of —ONH$_2$ per gram of resin.

COMPARATIVE EXAMPLE 1

Preparation of a Polymeric Hydrazide Reagent (Resin 2)

Twenty grams of chloromethylated polystyrene (80 meq Cl), was swelled by stirring in 300 ml of dimethylformamide (DMF) at room temperature. Methyl-3-mercaptopropionate (16.5 ml, 150 meq) and sodium methoxide (100 meq) suspended in 200 ml DMF were added, and the reaction mixture was stirred at room temperature overnight. The methyl thiopropionate resin was then filtered and thoroughly washed before vacuum drying. A modified Volhard titration of an aliquot of the product showed no residual chloride; i.r. 1720(s) (ester). A suspension of methyl thiopropionate resin (Sg) in 100 ml of absolute ethanol containing 5 ml of 99–100% hydrazine was refluxed for 4 hr. The resin was then filtered, washed and oven dried; i.r. 3415, 3205, 1605 cm$^{-1}$ (hydrazide carbonyl). The resin contained 1.3 mmoles of hydrazide per gram of resin.

EXAMPLE 2

Binding of Ketones and Aldehydes to Resins 1 and 2

The same general procedure was followed for binding compounds to either resin. For steroidal ketones, 5 mg of a steriodal ketone was stirred with 50 mg of either resin 1 or 2 in 5 ml of 10% acetic acid (HoAc) in benzene (v/v) at room temperature. In each case 0.02 μg (100,000 cpm) of a radioactive tracer of the steroid was also added. The counts remaining in the supernatant after 3 hr were in all cases less than 5%. The resin was then filtered, washed with additional benzene and oven dried. Infrared spectroscopy confirmed the binding of steroids to the resin; e.g., when pregnenolone acetate was bound to the resin, absorptions at 1735 cm$^{-1}$ and 1260 cm$^{-1}$, characteristic of the acetate group, and the fingerprint region absorptions of the steroid were present in the i.r. of the resin product. Binding of glucose an aldehyde, with resin 1 was also tested. D-glucose (75 mg) was dissolved in 10 ml of a DMF solution containing 15% acetic acid. [$^{14}$C]-D-Glucose (2.8×10$^5$ cpm, 150 ng) was added along with 300 mg of 1. The suspension was stirred overnight at room temperature. Monitoring of radioactivity showed that after 18 hr only 8% of the tracer remained in the supernatant.

Both resins 1 and 2 bound ketosteriods rapidly in benzene when catalyzed by acetic acid. The steroids studied included pregnenolone, pregnenolone acetate, pregnenolone oleate, progesterone, dihydrotestosterone, testosterone and dehydroepiandrosterone. By using $^3$H-labeled steroids along with the corresponding unlabeled steroids the rate of reaction was readily monitored by following the disappearance of radioactivity from the supernatant. At room temperature, the yield of oxime formation of all the above ketones with resin 1 reached 100% within 1 hr while hydrazone formation with resin 2 required at least 3 hr to reach completion. At early time points (5 min or less of reaction time) the reactivity of the monoketosteroids followed the expected order: Δ-4 3-keto > 17-keto ≧ 20-keto. There was, however, no selectivity in the binding of one keto group to another. In the case of a diketosteroid, e.g. progesterone, the infrared of the product resin would have shown only an absorption at 1710 cm$^{-1}$ (methyl ketone) had the resin (1 or 2) bound exclusively to the faster reacting Δ-4 3-keto group. However, after complete reaction, the infrared of the product resin showed both a 1710 cm$^{-1}$ absorption band as well as a band at 1680 cm$^{-1}$, the latter indicating that the resin had not bound exclusively to the Δ$^4$-3-keto group but had also reacted with the carbonyl at C-20

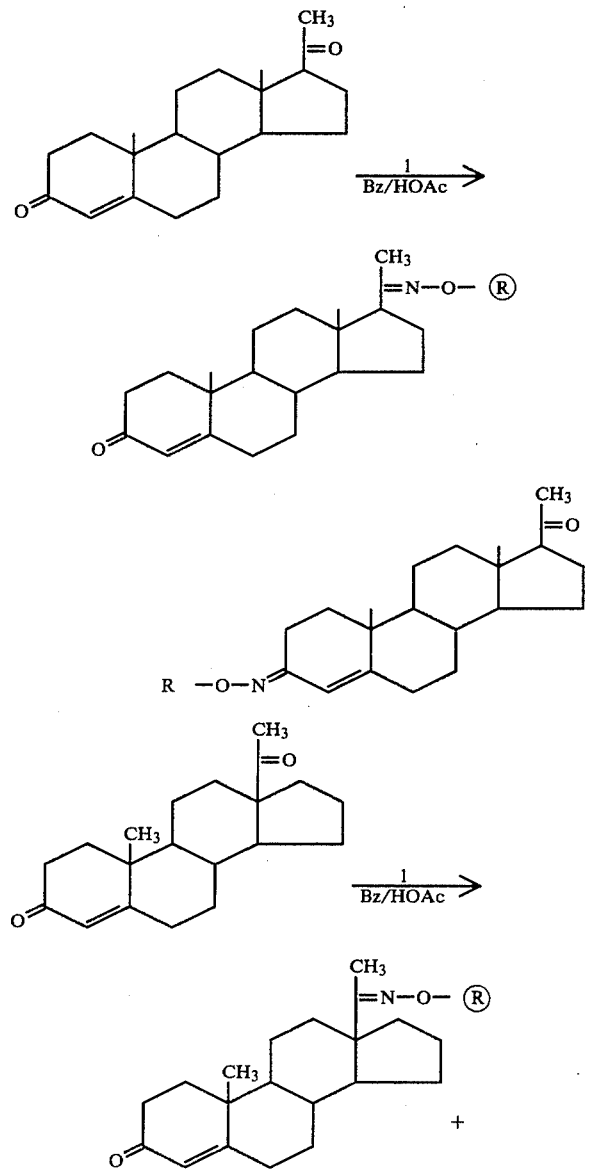

Scheme II

-continued
Scheme II

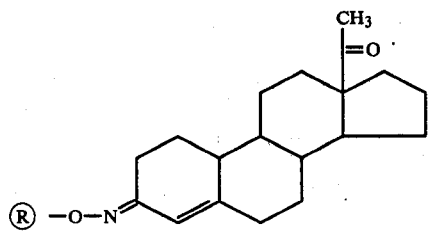

When resin 1 was tested with D-glucose in a solution containing 15% acetic acid in DMF, the binding of the sugar to the resin reached its maximum only after 18 hrs. Adehydes are known to normally be more easily derivatized with hydroxylamine than ketones. The fact that the rate of reaction was D-glucose was slower than those of the ketosteroids studied may be due to the different accessibility of the —$ONH_2$ groups in the resin in DMF as compared to their accessibility in benzene.

EXAMPLE 3

Regeneration of Carbonyl Compounds from the Resins

A suspension of the resin (50 mg) bearing the bound carbonyl compound in 5 ml of a mixture of tetrahydroturan (THF) and acetone (9:1) containing 125 μl of conc HCl was stirred 16 hr at 55°–60° C. The resin was filtered and washed with EtOAc (20 ml). The combined filtrates were then washed with water until neutral and taken to dryness. Recovered steroids were checked by celite chromatography or by thin layer chromatography (tlc). In each case the reisolated steroid possessed chromatographic properties identical with those of the starting compound. In all cases, yields of hydrolysis of 85–100% were achieved. No hydrolysis occurred in the absence of acid and yields were poor at room temperature. Typical results are shown in Table I for resin 1.

The regeneration of the bound glucose could likewise be achieved at 55° C. under the conditions described for the regeneration of the ketosteroids. The recovered glucose was shown to be identical with standard glucose by tlc on a cellulose plate (50 pyridine/50 EtOAc/10 HOAc/, 30 $H_2O$; $R_f$=0.42). Recovery was about 60%.

TABLE I

| Regeneration of Steroids From Resin 1 | | | | |
|---|---|---|---|---|
| | % Hydrolysis after 24 h | | | |
| | A | | B | |
| | RT | 55° | RT | 55° |
| Pregnenolone | 41 | 88 | 56 | 97 |
| Progesterone | 27 | 86 | 60 | 95 |
| Pregnenolone | 25 | 100 | — | — |

TABLE I-continued

| Regeneration of Steroids From Resin 1 | | | | |
|---|---|---|---|---|
| | % Hydrolysis after 24 h | | | |
| | A | | B | |
| | RT | 55° | RT | 55° |
| Oleate | | | | |

A 0.3 N HCl in THF with 10% acetone
B 1.2 N HCl in THF with 10% acetone

EXAMPLE 4

Relative Binding Rates of Various Steroids with Resins 1 and 2

The relative binding rates of pregnenolone, testosterone, dehydroepiandrosterone, androstenedione, and progesterone were determined with resins 1 and 2. Tritiam-labeled steroids (10 mg) were reacted with 100 mg of each resin in 7 ml of benzene containing 0.2 M acetic acid (or 10% acetic acid, about 1.2 M) at room temperature. The results are shown below in Table II.

TABLE II

| | | The relative binding rates of steroids of the Resins* | | | | |
|---|---|---|---|---|---|---|
| | | | | SUBSTRATE | | |
| Resin | Time (hr) | Pregnenolone; % | Testosterone; % | Dehydroepiandrosterone; % | Androstenedione; % | Progesterone % |
| 1 | 1 | 82 (94) | 81 (93) | 60 (80) | 72 (90) | 69 (92) |
| | 2 | 94 (99) | 86 (95) | 83 (94) | 88 (98) | 86 (99) |
| | 3 | 96 | 88 | 89 | 93 | 92 |
| 2 | 1 | 16 (55) | 54 (87) | 33 (66) | 30 (73) | 22 (81) |
| | 2 | 37 (58) | 72 (87) | 53 (87) | 52 (89) | 48 (93) |
| | 3 | 90 (82) | 82 (86) | 75 (93) | 65 (94) | 58 (98) |

*First numbers for each entry are the reactivities in 0.2 M acetic acid.
Numbers in parenthesis are the reactivities in 10% acetic acid.

As can be seen in Table II, the initial reactions were all more rapid with resin 1 (the aminooxy resin of the invention) than with resin 2 (a hydrazide resin similar to prior art resins). Furthermore, in every case, more steroid was bound to the resin of the invention after 3 hours than to the comparative resin.

A second series of binding reactions demonstrated the continued high binding efficiency of resin 1 with increasingly liphophilic steroids while the binding efficiency of comparative resin 2 decreased significantly. Prenenolone, pregnenolone acetate, and pregnenolone oleate were reacted as described above. The results are shown in Table III.

TABLE III

| Comparison of the Binding Efficacies of Resins with Pregnenolone and its derivatives* | | | | |
|---|---|---|---|---|
| | | SUBSTRATE; % | | |
| Resin | Time (h) | Pregnenolone | Pregnenolone Acetate | Pregnenolone Oletae |
| 1 | 2 | 82 (97) | 50 (86) | 7 (31) |
| | 18 | 99 (99) | 98 (98) | 75 (96) |
| | 24 | — | — | 86 (98) |
| 2 | 2 | 14 (50) | 4 (29) | 0 (0) |
| | 18 | 79 (79) | 28 (62) | 0 (7) |
| | 24 | 77 (73) | 35 (53) | 6 (11) |

*Numbers within parenthesis refer to binding in 10% acetic acid in benzene with the first numbers showing binding in 0.2 M acetic acid in benzene.

As can be seen in Table III, increasing the lipophilicity of the steroid reduces efficiency of binding to the hydrazide resin. Pregnenolone oleate binds at 11% efficiency after 24 hours to the hydrazide resin compared to 98% efficiency of binding to the resin of the invention (in 10% acetic acid).

EXAMPLE 5

Relative Rates of Hydrolysis of Pregnenolone Bound to Resins 1 and 2

Pregnenolone bound to resins 1 and 2 as previously described was hydrolyzed at 50° C. in 0.1 N HCl in benzene containing 10% acetone. Hydrolysis was initially faster for hydrolysis of the hydrazide, but hydrolysis of the resin of the invention surpassed the comparative resin slightly by the end of 4 hours.

TABLE IV

Relative Rates of Hydrolysis of Pregnenolone bound to the Resins

| Time (hr) | % Hydrolysis Resin 1 | % Hydrolysis Resin 2 |
|---|---|---|
| 2 | 11 | 32 |
| 2 | 23 | 37 |
| 4 | 41 | 40 |
| 24 | 78 | 74 |

EXAMPLE 6

Extraction of a Steroidal Ketone from a Natural Source

The efficacy of resin 1 in extracting pregnenolone oleate from an isooctane extract of bovine adrenal glands was determined to verify the ability of this resin to bind trace quantities of steroid lipoidal esters in animal tissue extracts. To a 10 g sample (corresponding to 215 g of adrenals) was added 1 µg of unlabeled pregnenolone oleate. Two other mixtures were prepared similarly, one containing 10 µg and the other 100 µg of the steroid ester. To each sample was added approximately 500,000 cpm of [7α-H$^3$]-pregnenolone oleate. Each sample was then treated with 1 g of resin 1. As shown in Table V, as little as 1 µg of the steroidal ketone could be recovered from the adrenal extract. On hydrolysis, 70 to 80% of the radioactivity was recovered in the supernatant. Purification of the regenerated steroid ester by celite chromatography resulted in retrieval of the bulk of the radioactivity as a material with the elution characteristics identical with those of pregnenolone oleate. Thus, the hydrolytic conditions employed for regeneration of ketones from the resin were sufficiently mild to have allowed the recovery of the intact steroid ester.

TABLE V

Extraction of Pregnenolone Oleate from a Non-Polar Fraction of Adrenal Glands with Resin 1

| Time (h) | % Reaction$^a$ 1 µg | 10 µg | 100 µg |
|---|---|---|---|
| 1 | 21 | 17 | 20 |
| 2 | 42 | 41 | 38 |
| 4 | 68 | 66 | 70 |
| 6 | 80 | 83 | 83 |
| 24 | 90 | 96 | 98 |

$^a$Determined as a function of the disappearance of radioactivity from the supernatant.

EXAMPLE 7

Use of Resin 1 as a Protective Group in Synthesis

3β-Hydroxy-5α-pregnan-20-one (allopregnanolone) was converted quantitatively (as determined by TLC analysis of the supernatant) into the oxime derivative by treatment with resin 1. The resin bound steroid was then oxidized with either pyridinium dichromate or with t-butylhypochlorite to a 3-keto steroid. The resin-bound steroid was then reduced with NaBH$_4$ in DMF containing a small amount of NaB$^3$H$_4$. In this way the 3-ketone was reconverted into the 3β-hydroxy steroid with concomittant introduction of $^3$H in the 3α position. The IR spectrum of the recovered resin showed no significant carbonyl absorption. The tritiated steroid was released from the resin by treatment with acid after which it was acetylated and the product purified by partition chromatography. Ninety-six percent of the radioactive material eluted from the column was characterized by tlc to be allopregnanolone acetate. This conversion demonstrates the stability of the resin of the invention to oxidation and its usefulness as a protecting group.

In carrying out the reactions, allopregnanolone (200 mg, 0.65 mmol) was dissolved in 15 ml of benzene containing 10% acetic acid and added to 750 mg of resin 1. The suspension was stirred for 2 hr at room temperature. Analysis of the supernatant by thin layer chromatography showed that all of the steroid had been bound. The resin was filtered, washed exhaustively (benzene, methanol and ether) and oven dried at 55° C. The infrared spectrum of the resin showed strong absorptions characteristic of a hydroxyl at 3400 cm$^{-1}$ and 1030 cm$^{-1}$. In one run the resin-bound steroid was oxidized with t-butylhypochlorite (2 ml) in CCl$_4$ (15 ml) at 50° C. for 2 hr. In another, pyridinium chromate in methylene chloride with pyridinium trifluoroacetate as catalyst was used. The resin from each run was washed exhaustively (water, CH$_2$Cl$_2$, aqueous methanol and ether) and oven dried, i.r. 3400 cm$^{-1}$ (—OH), 1730 cm$^{-1}$ (3-keto). An aliquot of the resin was then deoximated, and the released steroids were checked by tlc (2:1 benzene/ethyl acetate) using standard allopregnan-3,20-dione and allopregnanolone as markers. The results suggested that oxidation had occurred to a greater extent with t-BuOCl than with the chromium reagent.

The remainder of the resin was then reduced with ca. 25 mCi of NaB$^3$H$_4$ for 1 hr in 10 ml DMF with vigorous stirring. NaBH$_4$ (200 mg) was then added and the suspension stirred for an additional hr at 50°–55° C. The resin was filtered, washed successively with methanol, 50% aq. methanol, acetone, ether and oven dried; i.r. 3400 cm$^{-1}$ and 1030 cm$^{-1}$. The resin was then suspended in THF and deoximated as described above. The resin was filtered, washed with EtOAc and the combined filtates were washed with H$_2$O until neutral. Evaporation of the solvent left an oily product (ca. 140×10$^6$ cpm) which was acetylated with acetic anhydride and pyridine. The acetate was chromatographed by high pressure liquid chromatography (Corasil C-18) using as eluent methanol: H$_2$O (3:1). The bulk of the material (1×10$^8$ cpm) was eluted as one peak. The mass spectrum of the recovered crystalline material was identical with that of authentic allopregnanolone acetate (m/e:360 (P+)). The product had a specific activity of ca. 3 mCi/mmol.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A polymeric reagent for the isolation and protection of carbonyl compounds comprising:
   a polymer having a functional group of the formula —ONH$_2$ covalently attached to said polymer wherein said functional group is capable of reacting with a carbonyl group of a carbonyl compound when a solution containing said carbonyl compound contacts said reagent.

2. The reagent of claim 1, wherein said functional group is attached to a main chain or side chain of said polymer by an organic linking group.

3. The reagent of claim 2, wherein said linking group comprises a linear chain of carbon atoms.

4. The reagent of claim 3, wherein said linking group has the formula —(CH$_2$)$_n$—, wherein n=1 to 6.

5. The reagent of claim 2, wherein said linking group comprises a para-phenylene group.

6. The reagent of claim 1, wherein said functional group is attached to the main chain or a side chain of the polymer by a group having the formula

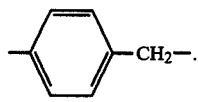

7. The reagent of claim 1, wherein said polymer is a polyolefin, polyester, polyamide, polyurethane, polyether, polycarbonate, polysiloxane, polyphosphazene, silica gel, or glass.

8. The reagent of claim 7, wherein said polyolefin is a polystyrene.

9. The reagent of claim 1, wherein said polymer is soluble in water or an organic solvent.

10. The reagent of claim 1, wherein said reagent is a polystyrene of the formula

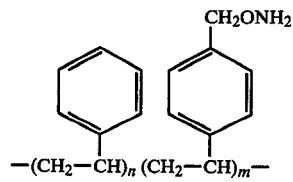

wherein the ratio of m to n is from 1:99 to 1:1, and wherein said polystyrene is crosslinked with from 0.5 to 10.0% divinylbenzene.

11. A method of extracting a carbonyl compound from a fluid medium, comprising:
    contacting the polymeric reagent of claim 1 with a fluid medium containing a free carbonyl compound wherein said free carbonyl compound reacts with said reagent to form a reagent-bound compound, and
    separating said reagent-bound compound from said fluid.

12. The method of claim 11, wherein said carbonyl compound is a steroid.

13. The method of claim 12, wherein said steroid is esterified with a fatty acid.

* * * * *

UNITED STATES PATENT AND TRADEMARK OFFICE
CERTIFICATE OF CORRECTION

PATENT NO. : 4,461,876
DATED : July 24, 1984
INVENTOR(S) : LIEBERMAN ET AL

It is certified that error appears in the above-identified patent and that said Letters Patent is hereby corrected as shown below:

Column 3, line 12, change "an" to --and--.

Column 14, in the heading for the fourth column of Table III, change "Prognenolone" to --Pregnenolone--.

Signed and Sealed this

Fifth Day of March 1985

[SEAL]

Attest:

DONALD J. QUIGG

Attesting Officer     Acting Commissioner of Patents and Trademarks